US010968950B2

(12) United States Patent
Schmitt et al.

(10) Patent No.: US 10,968,950 B2
(45) Date of Patent: Apr. 6, 2021

(54) METHOD FOR PRODUCING A SLIDING BEARING COMPRISING A CUNI2SI, CUFE2P OR CUSNX COMPOUND

(71) Applicant: Federal-Mogul Wiesbaden GmbH, Wiesbaden (DE)

(72) Inventors: Holger Schmitt, Pfungstadt (DE); Daniel Meister, Mainz-Kostheim (DE); David M. Saxton, Ann Arbor, MI (US)

(73) Assignee: Federal-Mogul Wiesbaden Gmbh, Wiesbaden (DE)

( * ) Notice: Subject to any disclaimer, the term of this patent is extended or adjusted under 35 U.S.C. 154(b) by 529 days.

(21) Appl. No.: 14/363,477

(22) PCT Filed: Nov. 29, 2012

(86) PCT No.: PCT/EP2012/073947
§ 371 (c)(1),
(2) Date: Jun. 6, 2014

(87) PCT Pub. No.: WO2013/083471
PCT Pub. Date: Jun. 13, 2013

(65) Prior Publication Data
US 2014/0363570 A1 Dec. 11, 2014

(30) Foreign Application Priority Data
Dec. 6, 2011 (DE) .......................... 102011087798.3

(51) Int. Cl.
*F16C 33/02* (2006.01)
*B05D 1/36* (2006.01)
*F16C 33/14* (2006.01)
*C22C 1/04* (2006.01)
*F16C 33/12* (2006.01)
*B22F 7/08* (2006.01)
*C23C 24/08* (2006.01)
*B05D 5/08* (2006.01)

(52) U.S. Cl.
CPC ............... *F16C 33/02* (2013.01); *B05D 1/36* (2013.01); *B05D 5/08* (2013.01); *B22F 7/08* (2013.01); *C22C 1/0425* (2013.01); *C23C 24/085* (2013.01); *F16C 33/128* (2013.01); *F16C 33/145* (2013.01); *F16C 2204/10* (2013.01); *F16C 2204/12* (2013.01); *F16C 2220/20* (2013.01)

(58) Field of Classification Search
CPC .... F16C 33/02; F16C 33/128; F16C 2204/12; F16C 2220/20
See application file for complete search history.

(56) References Cited

U.S. PATENT DOCUMENTS

| 5,566,449 A | * | 10/1996 | Okamoto | ................... B22F 3/17 29/425 |
| 2003/0059137 A1 | * | 3/2003 | Kawagoe | ................ F16C 33/14 384/276 |
| 2003/0064239 A1 | | 4/2003 | Saitou | |
| 2004/0008914 A1 | * | 1/2004 | Hiramatsu | ............ F16C 33/201 384/276 |
| 2007/0009757 A1 | * | 1/2007 | Takayama | ............. B22F 1/0003 428/644 |

FOREIGN PATENT DOCUMENTS

| DE | 2914618 A1 | 10/1980 |
| DE | 4430474 C1 | 3/1996 |
| DE | 19506684 A1 | 9/1996 |
| DE | 69327377 T2 | 6/2000 |
| DE | 102004008633 A1 | 9/2005 |
| DE | 102009002442 A1 | 10/2010 |
| DE | 102009002894 A1 | 11/2010 |
| EP | 0183375 A2 | 6/1986 |
| EP | 2184121 A1 | 5/2010 |
| GB | 648379 A | 1/1951 |
| GB | 754115 A | 8/1956 |
| JP | 60037415 A | 2/1985 |

OTHER PUBLICATIONS

International search report dated Mar. 11, 2013 (PCT/EP2012/073947).
Dai Zhirong, Engineering Materials and Mechanical Manufacture Basics (I)—Engineering Materials, 1st edition, published on Apr. 1992, p. 170 (with English translation) (previously cited in an IDS on Aug. 21, 2018 without English translation).
Dai Zhirong, Engineering Materials and Mechanical Manufacture Basics (I)—Engineering Materials, 1st edition, published on Apr. 1992, p. 170.

* cited by examiner

*Primary Examiner* — Michael P. Rodriguez
(74) *Attorney, Agent, or Firm* — Robert L. Stearns; Dickinson Wright, PLLC

(57) ABSTRACT

A sliding bearing includes a bearing surface which comprises a material in which an alloy material based on CuSnX ($0.01<X<9$), CuNi2Si, or CuFe2P is used. A method for producing such a sliding bearing and a use for CuNi2Si, CuFe2P, and CuSnX in a sliding bearing is also provided.

12 Claims, No Drawings

METHOD FOR PRODUCING A SLIDING BEARING COMPRISING A CUNI2SI, CUFE2P OR CUSNX COMPOUND

TECHNICAL FIELD

The present invention relates to a method for producing a sliding bearing.

TECHNICAL BACKGROUND

With regard to sliding bearings, it is important that they can be produced cost-efficiently while having a long service life and a low level of wear during use. Furthermore, sliding bearings should have low friction vis-à-vis the component supported by the bearing.

There have been several attempts to produce such sliding bearings. For example, U.S. Pat. No. 6,498,127 B1 discloses a sliding bearing material where a porous copper-tin alloy is applied onto a steel back with copper plating and this material is covered with a synthetic resin layer. As the copper-tin alloy used here, a copper alloy is used which contains 10% by weight tin and 0.2% by weight phosphorus.

Another sliding bearing material is described in U.S. Pat. No. 4,404,263. Here, a metallic matrix of an aluminum alloy is applied onto a back, in which 20% by weight tin and between 0 and 3% by weight copper are used, with $Al_2O_3$ particles being present in the alloy in a finely distributed manner.

Moreover, U.S. Pat. No. 5,624,887 describes a multilayer sliding bearing in which a bronze material is used for the bearing surface.

Finally, a sliding bearing material is described in EP 2 341 258 A1, in which a layer of polytetrafluoroethylene (PTFE) is applied onto a 0.3 mm thick phosphorus-bronze layer which has been sintered.

Moreover, the so-called "GLYCODUR" material CuSn10 is known as a lead-free material for sliding bearings, with "Glycodur" being a protected trademark. Such a material is described, for example, in U.S. Pat. No. 5,686,176.

U.S. Pat. No. 6,498,127 B1, DE 10 2009 017 362 A1 and EP 2 341 258 A1 constitute relevant state of the art.

DETAILED DESCRIPTION OF THE PREFERRED EMBODIMENTS

Starting from the state of the art, the need arises for a material which is characterized by an improved thermal conductivity and lower raw material costs in comparison to the Glycodur material CuSn10 already known.

Here, a sliding bearing is produced, in which the bearing surface, i.e. the surface of the sliding bearing opposite the component supported by the bearing during use, comprises a material based on an alloy material which in turn is based on CuNi2Si, CuFe2P or CuSnX ($0.01 \leq X \leq 9$). Here and in the rest of the application, a notation is used for alloys, which is described in DIN 1310.

The advantage for the aforementioned alloy is that it has a significantly better thermal conductivity in comparison to CuSn10, while the raw material costs are lower. The high thermal conductivity arises from the fact that the bronze material constituting the alloy material has a high conductivity, namely at least 60 W/mK, which makes it possible to avoid temperature peaks. The hardness, the mechanical properties and the sliding properties of the resulting porous bearing metal layer can be improved by setting the tin content. This is true inter alia when, as described further below, the bearing material is impregnated with polytetrafluoroethylene (PTFE) or other synthetic materials, as described in U.S. Pat. No. 5,686,176, for example.

For example, it is preferred that the alloy material is based on CuSnX, with X being less than 8, better less than 6. It has been found that a concentration of tin as low as possible, in particular lower than the indicated limit value, achieves a high thermal conductivity. Another advantage of this range is that, when the raw alloy material on which the material is based is atomized, powders are created with decreasing tin content, which have more spherical granules. Thus, with a tin content below the aforementioned value, powders can be produced, the particles of which have a good spherical shape. This in turn provides the advantage that the sinter matrix resulting from the sintering process as well as the pore structure and pore distribution thereof are more homogeneous.

It is also advantageous that the alloy material comprises altogether between 0.01 and 30% by weight aluminum, magnesium, silicon, titanium, zircon, chrome, zinc, manganese, iron, cobalt and/or nickel. These materials make it possible to set the mechanical properties and the sliding properties of the sliding bearing in an advantageous manner. Furthermore, these additives make it possible to improve the corrosion resistance: From a content of 1% of the total weight, the aforementioned elements result in an improvement of the corrosion resistance which, however, does not significantly improve with further increased amounts, i.e. the maximum corrosion resistance is achieved for 1%. If a higher amount is used, the mechanical properties are additionally influenced.

To set the mechanical resilience of the sliding bearing, it has also proved to be advantageous to incorporate hard particles (oxides, carbides, nitrides, silicides and phosphides), such as for example $Al_2O_3$, SiC, $Si_3N_4$, $Fe_3P$, $MoSi_2$, AlN, $MoC_2$, $SiO_2$, etc., into the sliding bearing. These materials increase the bearing capacity of the sliding bearing and, in the case of wear up to the bronze layer of the bearing, improve the emergency running properties thereof. This is due to a reduction of wear owing to the polishing properties of the hard particles. The transfer of bronze to the component supported by the bearing is prevented, i.e. the hard particles prevent the adhesion of the material of the component supported by the bearing to the bearing material and the seizure of the component supported by the bearing in the bearing.

Furthermore, it is preferred that the alloy material consists of a sintered powder. A material can be generated by this which has a high bearing capacity at a low weight and which can also be produced in a simple and flexible manner, in particular irrespective of the respective shape of the sliding bearing. It is particularly advantageous with this if the hard particles mentioned in the previous paragraph are already present in the powder which is sintered. By this, the production of the sliding bearing is simplified since it is not necessary to add the hard particles separately. Furthermore, it is an advantage of the latter variant of the method that it is not necessary to blend the hard particles separately into the powders to be used and to grind them for this. Moreover, such a method is easier to handle, and a segregation does not take place: The hard particles are present in the sinter layer in a homogeneously distributed manner.

During the production of a sintered layer, those powder amounts are preferably used, in which the granules have an average diameter of >80 μm. By this, a porosity is achieved which is particularly suitable for an impregnation with a synthetic material.

To further improve the sliding properties of the sliding bearing, it is also advantageous to incorporate solid lubricants such as hexagonal boron nitride, carbon and/or molybdenum sulfide ($MoS_2$) into the alloy material (powder) and/or optionally to blend these into the powder to be sintered. This results in lower friction between the sliding bearing and the component supported by the bearing, which provides the advantage that there is less wear. Of the aforementioned materials, hexagonal boron nitride is characterized by a high temperature resistance while it is chemically inert and stable in air up to 900° C.

It is further preferred that at least one synthetic material is applied onto the alloy material, which has a lower melting point than polytetrafluoroethylene. The sliding properties of the bearing are further improved by this.

In this context, it is preferred that hard particles such as oxides, carbides, nitrides and phosphides are embedded into the synthetic material, with materials such as $Al_2O_3$, SiC, $Si_3N_4$, $Fe_3P$, $MoSi_2$, AlN, $MoC_2$ or $SiO_2$ being particularly preferred here. The bearing capacity of the sliding bearing is increased by this.

It has also proved to be advantageous that solid lubricants such as hexagonal boron nitride, molybdenum sulfide, chalk or carbon are embedded into the at least one synthetic material. This also provides the advantage that the sliding properties of the bearing are improved.

According to the invention, the alloy material is produced by atomizing a raw alloy material, subsequently applying the atomized and now powdery raw alloy material onto a steel back and subsequently sintering. This method can be implemented easily and cost-efficiently. Air atomizers which can be used for such a method are particularly well-defined, which is why sliding bearings can be produced cost-efficiently with the same quality. Furthermore, by selecting the corresponding parameters, the granule size can best be set in order to obtain an optimum structure with open porosity.

According to the invention, it has also been found that the atomized raw alloy material is distributed in accordance with the granule size, with only those powder particles being used for producing the bearing material, which have a granule size either larger or less than a predetermined value, preferably 80 µm. This provides the advantage that all of the components of the atomized raw alloy material can be used, i.e. that only little waste is generated with the atomized raw alloy material. Moreover, by selectively using only one type of powder particles, a sliding bearing can be produced which has a precisely defined structure in the alloy material. The defined structure and the homogeneous pore structure are important for the even distribution of the synthetic material. This is particularly advantageous for ensuring good mechanical and tribological properties of the sliding bearing, such as for example low friction vis-à-vis a component supported by the bearing. Ideally, the bronze layer is never in contact with the component supported by the bearing during use since the polymer layer serves as a sliding layer. Should the component supported by the bearing pass through the polymer layer, the "emergency running properties" of the bronze layer are of interest.

It is in accordance with the invention here that a sieve fractionation method is used for distributing the powder particles. Such a method can be implemented easily and results in a high quality of the resulting sieved powder material. Furthermore, the desired open porosity can be set optimally by this, which results in a more homogeneous sinter matrix when the powder is sintered subsequently.

It is also advantageous if the required open porosity is set by a targeted mixing of powder particles of different sizes. A sliding bearing with good mechanical and tribological properties can be produced by this.

An advantageous embodiment of the present invention will be described below.

A copper alloy with the alloy formula CuSn6A11 is atomized in an air atomizer. Subsequent to this atomization, the coarse amount of the resulting powder, i.e. the granules having a granule size larger than 80 µm, is further used by a sieving process. Hard particles and solid lubricants are added to this powder amount using a mixing process in a ball mill or other mixer. This mixture is applied onto a steel back of C06, C10, C22 or C35 steel and is subsequently sintered at 800-1000° C. for 2-15 minutes. Thereafter, a coating consisting of PTFE (alternatives: polyoxymethylene, polyetherketone, polyethylene, polyamide, polyvinyl chloride, polyethylene terephthalate, polycarbonate or polypropylene) is applied onto the alloy material with the aforementioned solid lubricants and hard particles having a thickness of 0-0.5 mm, which penetrates into the pores thereof and thus forms a bearing surface. A thickness of 0 mm corresponds here to an impregnation where the bronze matrix shines through.

In comparison to the state of the art, the sliding bearing produced with the aforementioned procedure is characterized by improved sliding properties, better thermal conductivity and an increased bearing capacity.

The fine amount of the powder, i.e. those amounts of the powder having a granule size of less than 80 µm, are also applied and sintered onto a steel back using a similar method, by which sliding bearings for other applications are produced.

The invention claimed is:

1. A method for producing a sliding bearing,
   in which the bearing surface has a material in which an alloy material is used which is based on CuSnX, in which 0.01<X<9, CuNi2Si or CuFe2P,
   in which the alloy material is produced by air atomizing a raw alloy material, applying the air atomized alloy material onto a steel back and subsequently sintering,
   in which the air atomized alloy material is sieved, wherein only powder particles are used for producing the alloy material which have a granule size larger than 80 µm,
   in which PTFE or a synthetic material having a lower melting point than PTFE is applied onto the alloy material and penetrates into pores of the alloy material, and
   in which at least one solid lubricant is contained in the alloy material, and the at least one solid lubricant includes hexagonal boron nitride.

2. The method according to claim 1, wherein the alloy material is based on CuSnX, in which X is <8.

3. The method according to claim 1, in which the alloy material comprises altogether between 0.01 and 30% by weight Al, Mg, Si, Ti, Zr, Cr, Zn, Mn, Fe, Co and/or Ni.

4. The method according to claim 1, in which the at least one solid lubricant includes molybdenum sulfide and/or carbon.

5. The method according to claim 1, in which the sliding bearing has an open porosity which is set by a targeted mixing of particles of different granule sizes.

6. The method according to claim 1, wherein the alloy material is based on CuSnX, in which X<6.

7. The method of claim 1, including providing the sliding bearing with hard particles and/or solid lubricants.

8. The method according to claim 7, in which the alloy material contains the hard particles, and the hard particles include oxides, carbides, nitrides, silicides and/or phosphides.

9. The method according to claim 7, in which the alloy material contains the at least one solid lubricant, and the at least one solid lubricant includes chalk, molybdenum sulfide and/or carbon embedded into the synthetic material.

10. The method according to claim 8, wherein the hard particles comprise $Al_2O_3$, $SiC$, $Si_3N_4$, $Fe_3P$, $MoSi_2$, $AlN$, $MoC_2$, or $SiO_2$.

11. The method of claim 1, in which hard particles of oxides, carbides, nitrides, silicides and/or phosphides are embedded into the synthetic material.

12. The method according to claim 11, wherein the hard particles comprise $Al_2O_3$, $SiC$, $Si_3N_4$, $Fe_3P$, $MoSi_2$, $AlN$, $MoC_2$, or $SiO_2$.

* * * * *